April 28, 1936.  W. A. KNUST  2,039,252
DIRIGIBLE HEADLIGHTS AND THE LIKE FOR AUTOMOBILES
Filed June 25, 1932  3 Sheets-Sheet 1
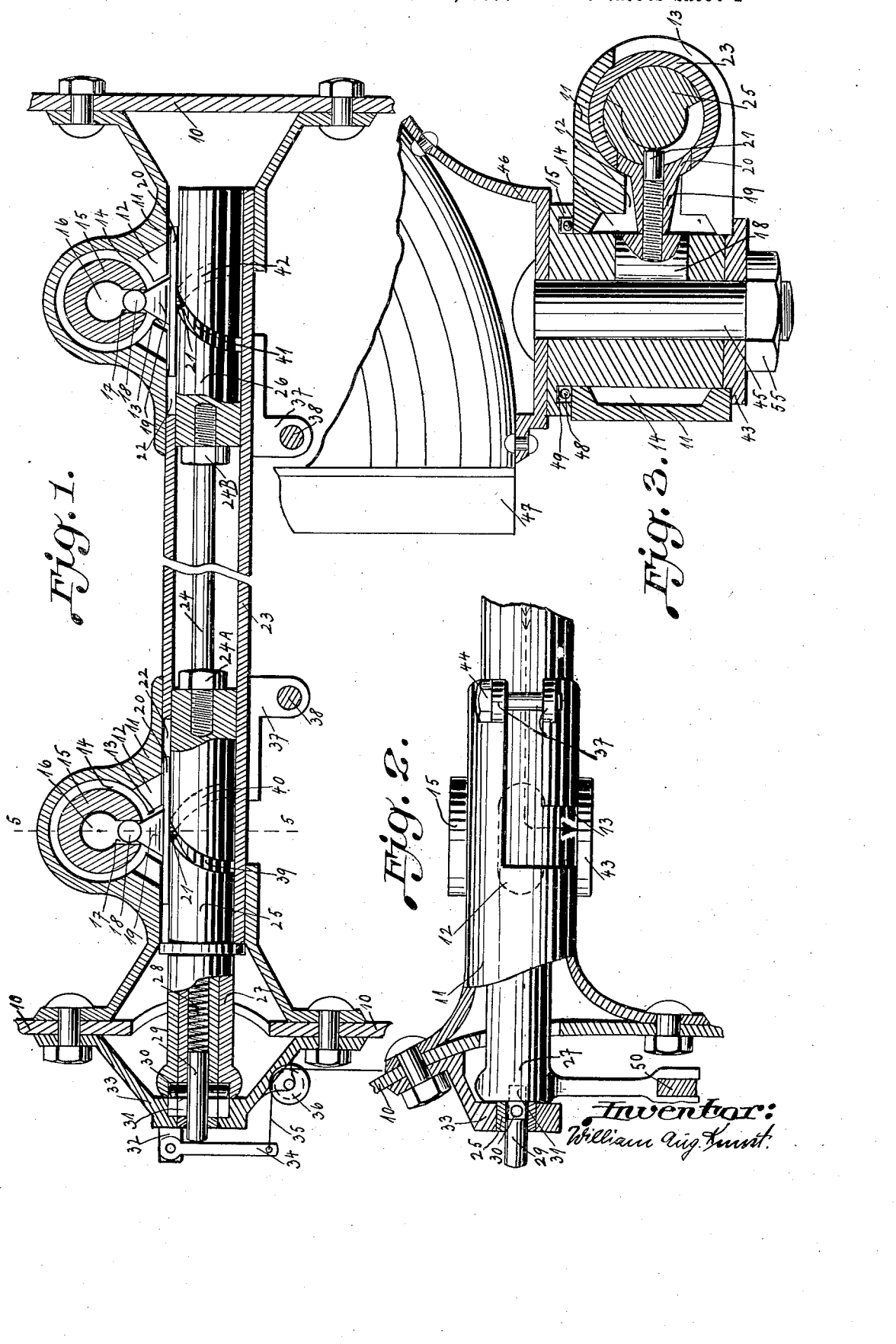
Inventor:
William Aug. Knust.

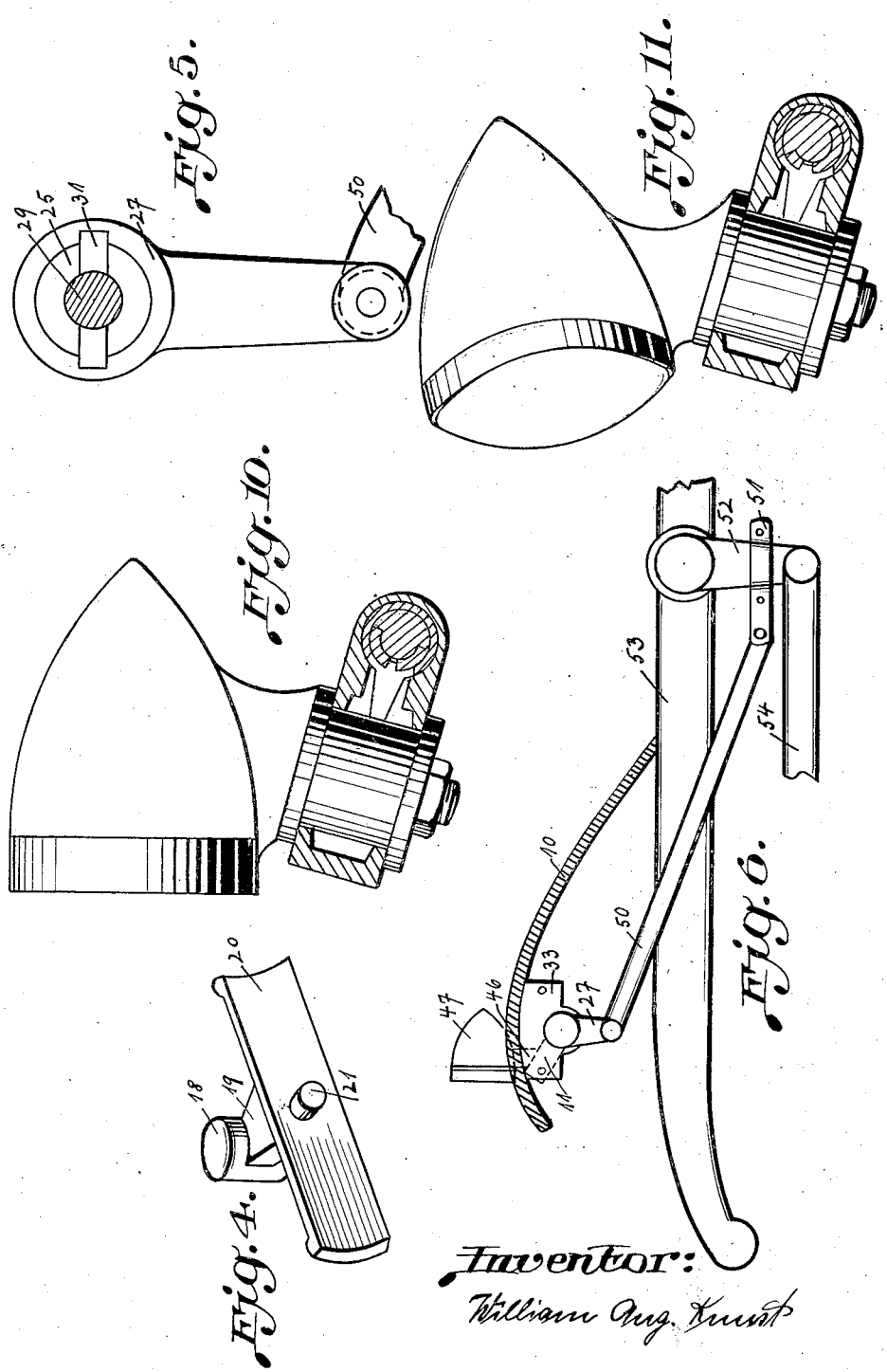

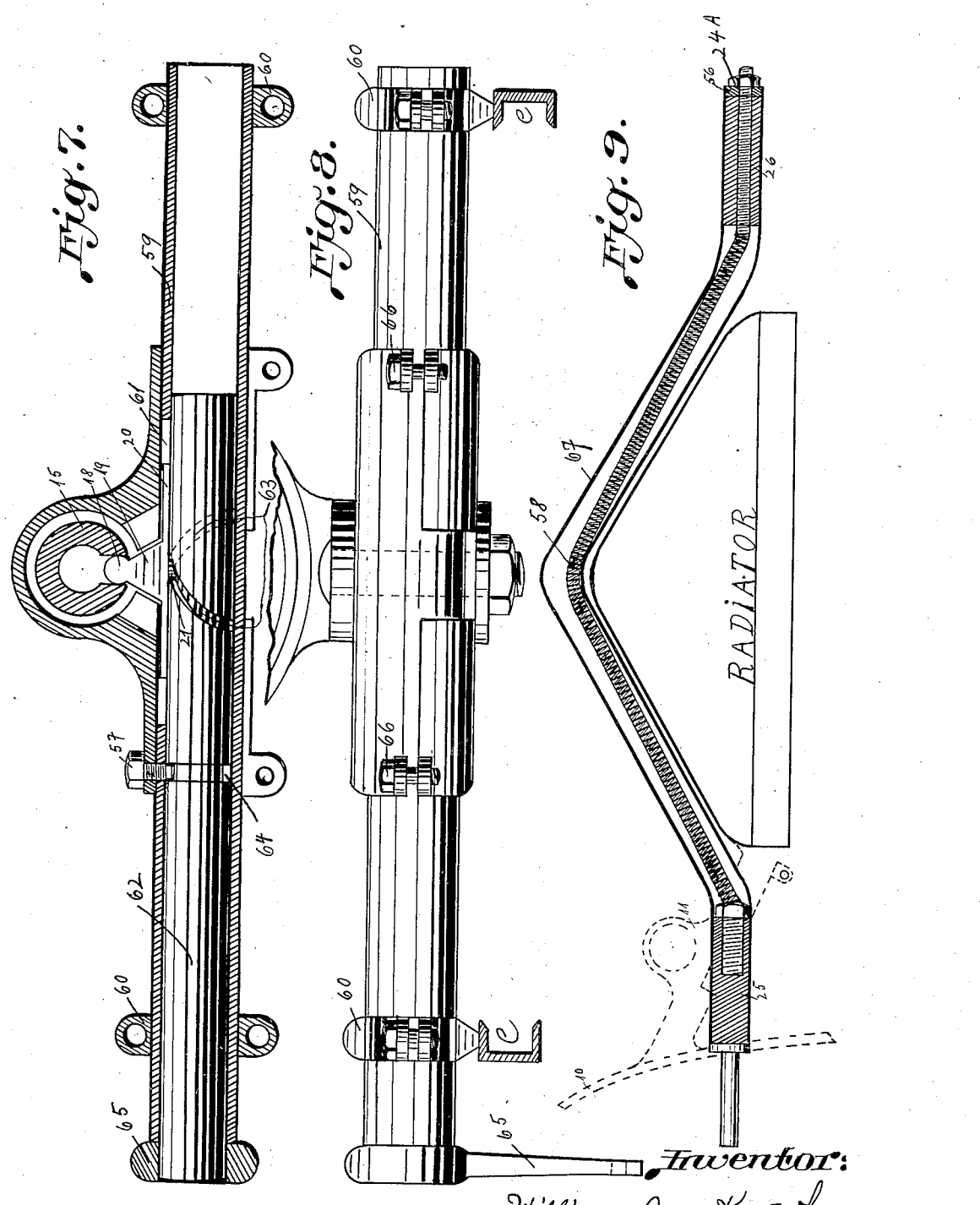

Patented Apr. 28, 1936

2,039,252

UNITED STATES PATENT OFFICE 2,039,252

DIRIGIBLE HEADLIGHTS AND THE LIKE FOR AUTOMOBILES

William August Knust, Hoboken, N. J.

Application June 25, 1932, Serial No. 619,339

7 Claims. (Cl. 240—62)

This invention is an improvement in dirigible headlights and the like for automobiles and has for an object the provision of a simple compact mechanism, which is operated automatically by the steering mechanism.

Another object of the invention is the provision of mechanism to disconnect the light mechanism when desired.

A primary object of the invention is to turn the headlights simultaneously to different angles on vertical axes, or to turn and tilt them to the mentioned angles and different degrees on axes, which are held at an angle to the headlights. The means with which these turns are accomplished will be described hereafter.

Still another object of the invention is to use the means as presented with slight changes as a movable spotlight. These are placed in front and below the headlights on the chassis. The requirements for such light will be stated at the end of the specification.

With the above and other objects in view the invention further includes the following novel features and details of construction, to be hereinafter more fully described, illustrated in the accompanying drawings and pointed out in the appended claims.

In the drawings:—Fig. 1 is a cross-sectional view of the whole device mounted on the fenders. Fig. 2 is one bracket mounted on the fender with a view of the rocking-member. Fig. 3 is a cross-sectional view of one of the brackets on the line 5—5. Fig. 4 is a connecting element as it appears in this construction. Fig. 5 shows the rocking arm of the rocking member with part of the connecting rod. Fig. 6 is a connection from the steering lever to the device. Fig. 7 is a cross sectional view of a spotlight. Fig. 8 is a complete spotlight mounted on the chassis. Fig. 9 indicates the operating shaftings 25 and 26, connected by a flexible shaft and disposed in a curved sleeve. Fig. 10 shows one headlight in central position. The turning axis of the headlight is held at an angle to the face of the light. Fig. 11 shows the same light turned out of its central position into an angular position. The light appears turned and tilted.

In detail in the drawings:—10 designates the customary fenders on which the device is mounted. 11 indicates two brackets preferably made of cast steel. The brackets are shaped on their outer side to obtain a firm support, as shown in Figure 2, to the fenders; on their inner side the brackets are connected by a sleeve mentioned later. Each of the brackets is provided with two bores which are located at an angle of 90° to each other and a slot 12 in which the entire means to operate the headlights is disposed. To distinguish the bores from each other the longitudinal bore will be called the horizontal bore, and the one at an angle thereto the vertical bore.

The brackets are further provided with an opening 13 on the bottom side and parallel to the horizontal bore on the inner side with another slot. (Follow arrow in Fig. 2). There are also ears indicated as 37 provided with holes 38, the bottom holes threaded, in each of which a screw 44 is placed. The last mentioned slot in each bracket and the opening 13 are required to install the connecting element described hereafter. The vertical bores of the brackets are provided with a recess 14, best shown in Fig. 3, and made to allow a turn of 45 degrees of the lights. 15 designates two bronze bushings each rotatable in the vertical bores and also best shown in Fig. 3. The bushings are provided with a hole 16 in which the headlight studs are disposed securing the headlights to the bushings and an open slot 17 in which means to rotate the bushings is disposed. The shoulder of each bushing is provided with a recess in which balls 48 and a flat curved spring 49 are disposed. These have to be applied only when absolutely necessary to prevent bushings from rattling. 23 indicates a sleeve, the ends of which are held by the entire horizontal bores of the brackets. The ends of the sleeve are provided with slots 22 in which the slide of the connecting element is slidable longitudinally. In the ends are rotatable two pieces of shaftings preferably cold rolled steel, and indicated as 25 and 26. The shaftings are connected to each other by means of a rod 24 and secured as shown in Fig. 1 by nuts 24A and 24B. The sleeve 23 and rod 24 have to be of a certain length. The sleeve with brackets applied to its ends is to correspond to the correct distance between the fenders, and the rod is to be the correct length to fit as shown in Fig. 1 between the operating shaftings 25 and 26.

The shafts 25 and 26 are provided with differently pitched corresponding portions of spiral grooves. Shaft 25 (Fig. 1) has one portion 39 which has less pitch than the portion 40. On shaft 26,—41 is designated as the portion with more pitch, and 42 the one with less pitch, but the pitch of the portions for each shaft is alike. The shaftings have to be so arranged in assembling them that the corresponding points of the portions are parallel and that the portions of greater pitch are in opposite position as it is shown in Fig. 1 on the inner side of the device.

The rod 24 may be replaced by a flexible shaft 58, provided on each end with a stud. This permits the use of a curved sleeve 67 between the brackets. For this feature the shaft 26 must be provided with a threaded hole as it is shown in Fig. 9. Secure the shaft 25 to the flexible shaft and dispose the means in the sleeve. Screw the shaft 26 to the second stud into the sleeve until shaft 26 is flush with the sleeve. Apply on the outcoming thread of the second stud a washer 56, which will fit against the rim of the sleeve and secure with nut 24A the shaft to the stud; using this flexible shaft it allows also to shape the brackets on their fastening points to any degree as it is shown in Fig. 9 in the dotted lines. A suitably curved sleeve has to be applied here.

18, 19, 20 and 21 indicate the element in Fig. 4 which connects the spiral grooves with the open slots in the bushings. Each of the elements is formed as follows: 20 indicates a slide and 19 an extension on the slide and preferably cast of bronze. The slide and extension are provided in the center with a threaded hole, best shown in Fig. 3, in which the stud 21 is screwed tight. Pin 18 is secured by the thread of stud 21 to extension 19. It will be observed here that these three parts when assembled represent a solid element. To install one of the elements it is required to connect first the shaft or spiral mechanism as described and push it into the sleeve until it stops on the shoulder on shaft 25. It will then be observed that each shaft with portions of spiral grooves is disposed to each slot in the sleeve. Take a connecting element, place the slide into the slot 22 in the sleeve. It appears then that stud 21 is placed in the spiral groove and the slide is also disposed to the shaft. Slip the required bracket, (without screw 44) with its horizontal bore over the mentioned means until it stops. Extension 19 of the connecting element has thereby to pass the inner slot of the bracket, (follow arrow in Fig. 2). Turn either the bracket or the sleeve with its means in it, until it stops again. Pass by this movement, with extension 19 of the connecting element, the opening 13 in the bracket. The element is then disposed to its operating place. Extension 19 appears then in the slot 12 in the bracket and pin 18 in the vertical bore of the bracket. Replace screw 44 and tighten with this screw the bracket to the sleeve. When then a bushing is placed into the vertical bore of the bracket it will be observed that pin 18 is covered by the open slot 17 of the bushing.

Shaft 25 is extended through the fender and supported by the bracket 33. This extension is provided with an axial bore and radial slots in which disconnecting mechanism such as spring 28, pin 29 and radial pin 30 are disposed. There is also the rocking member 27 adapted to this extension and held in position by the bracket 33 and the shoulder on the shaft 25. The rocking member and the bracket 33 are both provided with radial grooves which are indicated as 31. These grooves and radial slots in the extension are for adaption of the terminals of radial pin 30 therein.

The arm of the rocking member 27 is provided with a fork to which rod 50 is connected. As best shown in Fig. 6 this rod is also connected to clamp 51 on the steering lever 52 which last mentioned is movable on the chassis 53.

To operate the disconnecting mechanism from the driver's seat a small reversing lever should be mounted to the dashboard. The flexible wire 35 which is fastened to the arm 34 should be extended over pulley 36 and other pulleys to the reversing lever and fastened here also. When then this lever is moved in one direction it appears that the arm 34 which is movable on the ear 32 on bracket 33 will be moved by the spring 28 and pin 29 outwardly. The terminals of radial pin 30 will then be adapted in the grooves 31 in the bracket 33 and the headlight mechanism disconnected from the steering mechanism. Moving the lever in the other direction arm 34 will move the terminals of radial pin 30 by the terminal of pin 29 into the grooves 31 in the rocking member 27 and connect the headlight mechanism with the steering mechanism.

A complete headlight is shown in Fig. 3, 47 the headlight, 46 the hub and 45 the stud of the headlight. 54 indicates the connecting rod to the front wheels.

The turning of the lights on vertical axes is accomplished as it is shown in Fig. 3 of the drawings. The face of the headlight and its turning axis (the bushing) appear both parallel and vertical.

The combined turning and tilting of the lights is accomplished in tilting the front face of each bracket ten to fifteen degrees upwardly but keeping the face of the headlights in central position also "vertical". This is shown in Fig. 10 of the accompanying drawings. The offset or angle which appears here between the face of the headlight and its turning axis (the bushing) makes it possible that when each headlight is turned out of its central position into an angular position it is not only turned but also tilted as it is shown in Fig. 11 of the accompanying drawings.

If the device is now properly assembled and secured in the tilted position, as it is described, to the fenders it is only required to dispose in each hole of the bushing the stud of the headlight, as described. Slip the washer 43 (Fig. 3) on the stud and tighten with nut 55 each headlight by its stud, vertical and parallel to the longitudinal axis of an automobile, to the bushing. Connect the device so to the steering lever that the light next to the curve operates in its turning position by the greater pitched portion of the spiral groove at an angle of 90° with the front wheels.

When then the steering wheel is operated to turn the wheels as for movement to the left the operating shaftings start also rotating; and going out from the corresponding points of portions of the spiral grooves it will be observed that the studs 21 of the connecting elements move into the portions 40 and 42 of the spiral grooves. Portion 40 has more pitch than portion 42 and the headlight connected to portion 40 will be turned to a greater angle and tilted more degrees than the headlight connected to portion 42. For a right turn the procedure is the reverse. Portion 41 of the spiral groove has more pitch and portion 39 less pitch. Therefore, the headlight connected at this time to portion 41 is turned to a greater angle and tilted more and the headlight connected to portion 39 of the spiral groove is turned to a lesser angle also tilted less. It will be observed here that the light outside the curve is always turned to a lesser angle and tilted to a lesser degree than the light next to the curve.

If the device is secured in horizontal position to the fenders turning lights simultaneously to different angles only are accomplished.

The turns as they are described here are based upon the principle to make the crossing portion of the rays or beams of two headlights profitable and illuminate thereby the curves as much as possible. It can be arranged as follows: Provide the operating shaftings 25 and 26 with the greater pitched portions of spiral grooves. Assemble the bracket of the steering side complete. Slip the second bracket on the sleeve without the connecting element. Mount the device to the fenders and connecting the same so to the steering mechanism that the light on this side operates in its turning position by the present portion of the spiral groove at an angle of 90° with the front wheels. Turn the wheels with this one headlight to their limit. Apply the second headlight and adjust the same so that the inner beam of this light meets the inner beam of the turned light. Indicate the pitch of the portion of the spiral groove for the second light. Provide both shaftings with these portions in connection with the present greater pitched portions. Reassemble entirely and turn both lights by the steering mechanism. It will then be observed that with every movement of the wheels the rays will have a wider lateral spread at the curve.

While headlights are not standardized the crossing portion of the rays or beams in the various types of lights will be different. But considering here the different types of lights the pitch of the portions of the grooves which turn the outward lights must be determined to the above mentioned adjustment.

The tilting of the lights as it is stated before, is arranged by keeping the face of the headlights at an angle to their turning axes. The tilting to different degrees is produced in conjunction with the turn of the lights by the means of spiral grooves as described. Considering the combined turning and tilting, the rays of the lights will not only be more laterally spread at the curves, but also in a closer form which is shaped to an irregular rectangle, nearer to the curve and wider on the outer side.

Reference to Fig. 7 and Fig. 8, "the spotlight".

A sleeve 59 has to be mounted by clamps 60 to the front chassis C. The sleeve is provided with a slot 61 in which the slide 20 of the connecting element travels. 62 indicates a shaft in the sleeve and 63 an even spiral groove on the shaft. 64 indicates a recess on the shaft and 57 a setscrew fitted into this recess to keep the shaft in position. The arm 65 is by any suitable means secured to the shaft and connected by means of a rod to the steering mechanism. The bracket is formed similar as in the headlight mechanism. The bracket is both sides slotted and can be fastened with two screws 66 to the sleeve. The bushing 15 and the connecting element concerning the Figures 18, 19, 20, and 21 are the same as in the headlight construction. When properly assembled and connected to the steering lever, it appears here, by going out from the center of the spiral groove, that the bushing and the lamp secured thereto, will turn to the left and to the right to the same angle. I do not make any special claims to the spotlight construction but elements as they are used in the headlight and spotlight construction and only claimed in the headlight construction will include the spotlight also.

Having described this invention fully what is claimed as new, and desired to be secured by Letters Patent is:—

1. In combination with an automobile, a pair of headlights simultaneously turnable into different angular positions on vertical axes, and mechanism for connecting said headlights to the steering mechanism, said mechanism consisting of a pair of rotatable shaftings having differently pitched portions of spiral grooves which operate from their connecting or corresponding points in such a manner that a portion of greater pitch turns the headlight next to the curve at a greater angle than the headlight on the outer side of the curve is turned, and that a portion of less pitch turns the headlight on the outer side of the curve at a lesser angle than the headlight next to the curve is turned, substantially as described.

2. In combination with an automobile, a pair of headlights simultaneously turnable into different angular positions and tiltable to different degrees on axes which are held at an angle to the headlights, and mechanism for connecting said headlights to the steering mechanism, said mechanism consisting of a pair of rotatable shaftings having differently pitched portions of spiral grooves which operate from their connecting or corresponding points in such a manner that a portion of greater pitch turns the headlight next to the curve at a greater angle and tilts it more degrees than the headlight on the outer side of the curve is turned and tilted, and that a portion of less pitch turns the headlight on the outer side of the curve at a lesser angle and tilts it to lesser degrees than the headlight next to the curve is turned and tilted, substantially as described.

3. In a device of the character described, a pair of brackets, each having a slot and a horizontal and a vertical bore, the brackets being shaped on their outer sides to obtain a firm support at the fenders, on their inner sides being connected by a sleeve of which the ends are held by the entire horizontal bores, the vertical bores of said brackets being provided with rotatable bushings each having an open slot and a hole, the slots of said brackets and the ends of the sleeve being provided with mechanism connecting operatively the open slots of the bushings, substantially as described.

4. A shaft having an extension provided with disconnecting mechanism and a bracket and a rocking member, the last two mentioned having radial grooves, the disconnecting mechanism consisting of a spring and a radial and an axial pin, the bracket supporting the extension on its outer end, the rocking member to be connected to the steering mechanism by means of a rod, the terminals of said radial pin being adapted to engage the grooves of said bracket to disconnect the headlight mechanism from the steering mechanism, or adapted to engage the grooves in said rocking member to operate the headlight mechanism by the steering mechanism, substantially as described.

5. In a device of the character described, a pair of operating shaftings, each having differently pitched corresponding portions of spiral grooves, the said shaftings being connected to each other by means and rotatably journaled in a sleeve which slotted ends are held by horizontal bores of a pair of fender brackets, the spiral grooves of said shaftings and the slots of the sleeve being provided with mechanism connecting operatively open slots of a pair of rotatable bushings also disposed in the fender brackets, and mechanism connecting the steering mechanism of an automobile with the said shaftings to operate the same, substantially as described.

6. In a device of the character described, connecting elements, and each consisting of a slide with an extension, a stud and a pin, each of the said elements being disposed with its slide to a shaft having a spiral groove and slidable longitudinally in a slot of a sleeve, the extension of each element being disposed in a slot of a fender bracket, each of the said elements connecting with its stud operatively the spiral groove in the shaft and with its pin an open slot of a rotatable bushing also disposed in the fender bracket, substantially as described.

7. In a device of the character described, bushings, each having an open slot and a hole, each bushing being rotatably mounted in a vertical bore of a fender bracket, the hole of each bushing being provided with a headlight stud securing a headlight to the bushing, the open slot of each of said bushings being provided with mechanism connecting operatively a spiral groove in a shaft also disposed in the fender bracket, and mechanism connecting the steering mechanism of an automobile with the said bushings to rotate the same whereby the lamps of the automobile are turned or turned and tilted, substantially as described.

WILLIAM AUGUST KNUST.

CERTIFICATE OF CORRECTION.

Patent No. 2,039,252.

April 28, 1936.

WILLIAM AUGUST KNUST

It is hereby certified that error appears in the printed specification of the above numbered patent requiring correction as follows: Page 1, first column, line 4, after the word "mechanism" strike out the comma; page 4, first column, line 5, claim 6, strike out the word "and"; and line 6, same claim, after "extension" strike out the comma and insert instead the word and; and that the said Letters Patent should be read with these corrections therein that the same may conform to the record of the case in the Patent Office.

Signed and sealed this 14th day of July, A. D. 1936.

Henry Van Arsdale
Acting Commissioner of Patents.

(Seal)